May 12, 1931.  G. H. HEDRICK  1,805,284
AUTOMOBILE BUMPER
Filed April 8, 1930   2 Sheets-Sheet 1
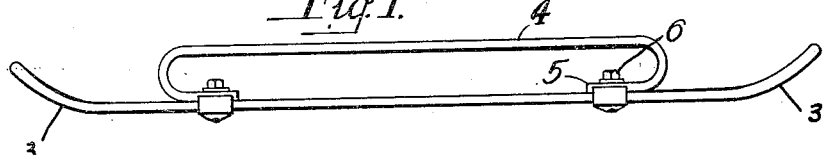
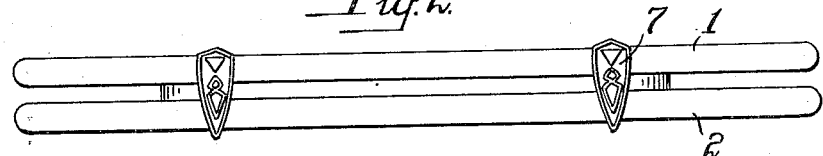
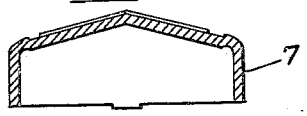
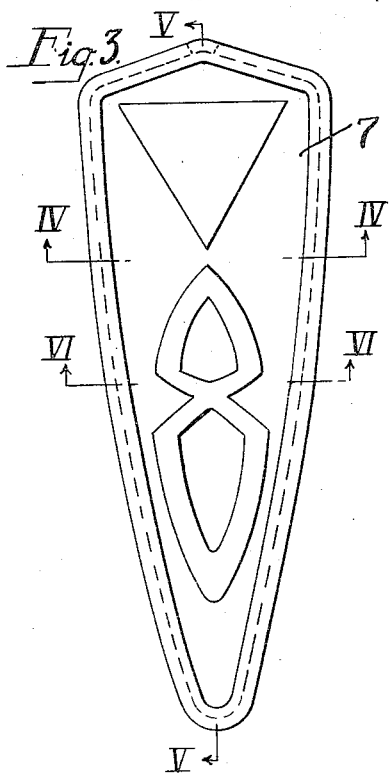
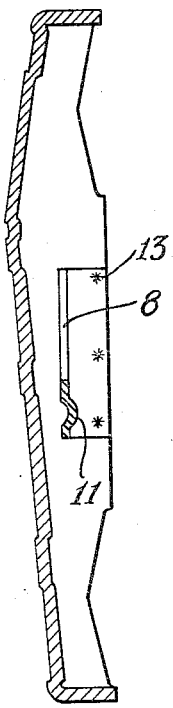
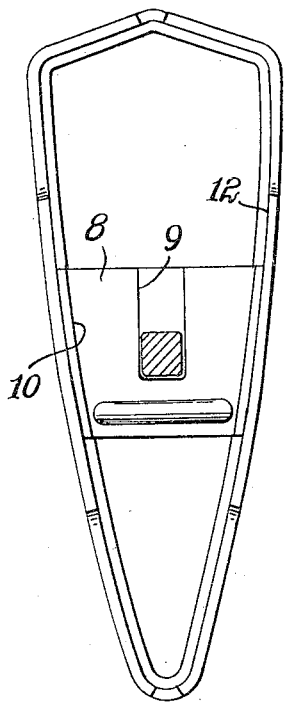
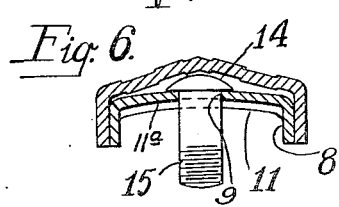
INVENTOR
Gale H. Hedrick
by
William B. Jaspert
Attorney May 12, 1931.     G. H. HEDRICK     1,805,284
AUTOMOBILE BUMPER
Filed April 8, 1930    2 Sheets-Sheet 2
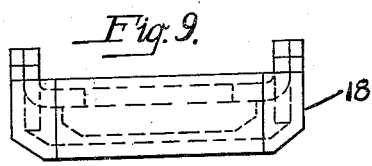
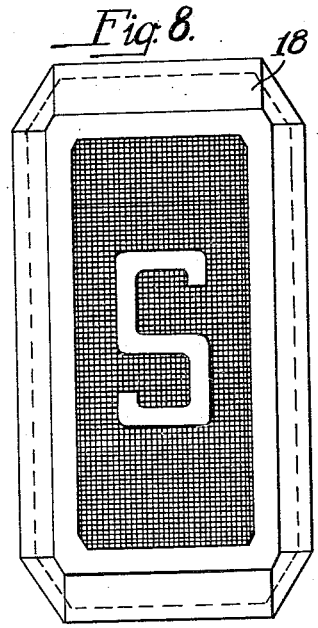
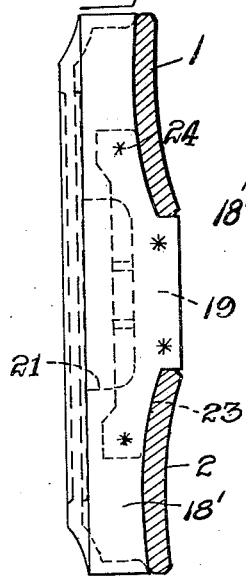
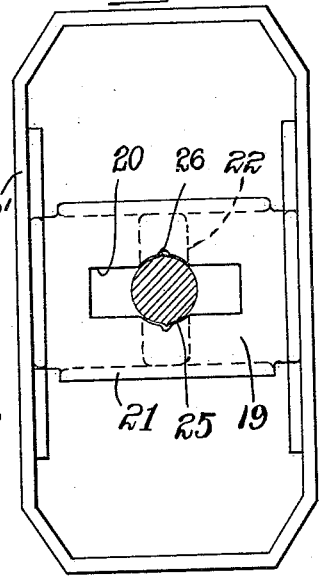
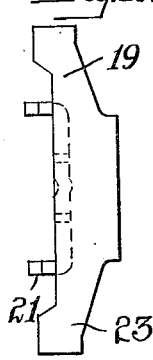
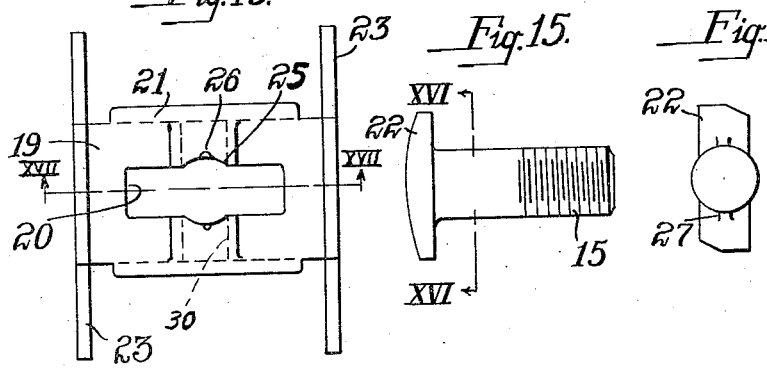
INVENTOR
Gale H. Hedrick
by
William B. Jaspers
Attorney Patented May 12, 1931

1,805,284

UNITED STATES PATENT OFFICE

GALE H. HEDRICK, OF GLENSHAW, PENNSYLVANIA, ASSIGNOR TO GEM MANUFACTURING COMPANY, OF PITTSBURGH, PENNSYLVANIA, A CORPORATION OF PENNSYLVANIA

AUTOMOBILE BUMPER

Application filed April 8, 1930. Serial No. 442,519.

This invention relates to bumpers for automobiles, more particularly to means for fastening the several bumper parts to constitute them a unitary structure with their support.

It is among the objects of this invention to provide fastening means for bumpers which shall provide for the covering of the clamping elements so that they do not visibly interfere with the ornamental effects of the bumper, and to this end means are provided for employing medallions on the clamping elements so that the clamping bolt and nut are hidden from view.

Heretofore, bumper parts have been fastened to the supporting bar by interlocking the nut element with the medallion structure, which necessitates the use of expensive dies and involves a great number of complicated manufacturing operations that greatly increase the cost of bumpers.

In accordance with the present invention, the clamping means is of simple and durable mechanical construction and is applied to the medallion in a simple and inexpensive manner to form a unitary structure therewith and to provide a ready access for the application of the bolt or clamping screw.

The features of the invention will become more apparent from a consideration of the accompanying drawings in which like reference characters designate like parts and in which Fig. 1 is a top plan view of a bumper structure of a well known design; Fig. 2 a front elevational view thereof; Fig. 3 a front elevational view of a medallion for the bumper fastening means embodying the principles of this invention; Fig. 4 a cross sectional view thereof taken along the line IV—IV, Fig. 3; Fig. 5 a vertical sectional view taken along the line V—V, Fig. 3; Fig. 6 a cross sectional view taken on the line VI—VI, Fig. 3; Fig. 7 a rear plan view thereof; Fig. 8 a front elevational view showing a modified form of the medallion of which Fig. 9 is an end elevation; Fig. 10 a side elevation; Fig. 11 a rear plan view; Figs. 12, 13 and 14, side, front and end elevational views of the clamping element which is attached to the medallion shown in Figs. 8 and 11; Fig. 15 a side elevational view of a special clamping bolt; Fig. 16 an end view of the bolt taken along the lines XVI—XVI, and Fig. 17 a cross section on line XVII—XVII, Fig. 13 showing a modified form of bolt seat.

With reference to Figs. 1 to 7 inclusive of the drawings, the structure therein illustrated comprises a pair of bumper bars 1 and 2 having curved ends 3 and a rear supporting bar 4, the latter being curved at its ends to form the extensions 5 by means of which the bars 1 and 2 are supported.

The clamping means as shown in Fig. 1 constitutes a screw and nut element generally designated at 6, which passes through the extension 5 and cooperates with a medallion 7. The clamping means is more clearly illustrated in connection with Figs. 4 to 7 of the drawings, and consists of the medallion 7 of an ornamental shape having a curved front face with configurations of any suitable design, such as the resemblance of a figure 8 or the triangle as shown in Fig. 3.

In accordance with the present invention, a clamping bracket 8 is secured to the medallion 7 and consists of a channel shaped member having a slot 9, side flanges 10 and a distorted portion 11 which functions to strengthen the clamp by giving it a structural shape making it more rigid. The clamping bracket 8 is of the shape and dimensions of the inner face 12 of the medallion and is adapted to snugly engage the sides thereof to which it is secured as by spot welding at the portion designated by the stars 13. The clamp 8 is fastened to the side flanges of the medallion in spaced relation from the front face to provide clearance for the head of a bolt 14 as shown in Fig. 6, the bolt being disposed in the slot 9 of the clamp so that its screw thread portion 15 may be extended through a hole or perforation in the rear bumper bar 4, Fig. 1, to which it is secured by a screw nut that cooperates with the thread 15 of the clamping bolt. The slotted portion 11a is raised or bulged inwardly so that when the clamping bolt 14 is drawn up by the nut 6, the bulged portion will tend to straighten, thus exerting pressure by flanges 8 on the sides of the medallion which relieves the strain on the welds.

With reference to the remaining figures of the drawings, the clamping device therein illustrated is a modification of that just described, and consists of a medallion 18 having an ornamental front face and flanged sides 18' which are adapted to receive the clamping member 19 shown in detail, Figs. 12 to 14 and 17. The member 19 is provided with an elongated opening or slot 20 and with upstruck portions 21 which constitute legs or chairs adapted to seat against the inner face of the medallion to provide reinforcement and a suitable space or clearance for the long and narrow head 22 of the bolt shown in Figs. 15 and 16. Side flanges 23 of the clamp have outer dimensions corresponding to the inner dimensions of the flanges of the medallion and are of the general contour of the side flanges 18' as shown in Fig. 10. Side flanges 23 are of such length that their ends extend beyond the bumper bars 1 and 2 when in clamping relation so that the clamping strain is exerted on the ends 23 of member 19 instead of the welds 24. The edges of the ends 23 are complementary to the shape of the bumper bars 1 and 2 Figure 10 to distribute the clamping strains over a large area. The members 19 are secured to the medallion in the manner described in connection with the remaining figures of the drawings by spot welds, as at 24, the spot welds being applied to the ends and near the center of the clamping means, and the side flanges of the medallion 18. The medallions are fastened by projecting the elongated head 22 of the bolt through the slot 20 and turning the same 90° to the position shown in Fig. 11 in which position it intimately engages the clamping means and may be attached to the rear bumper bar 4 by a nut 6, as previously described.

As shown in Figs. 11 and 13, the clamp is provided with a rounded portion 25 corresponding to the shape of the screw bolt and it is further provided with niches 26 that are adapted to cooperate with sharp fillets 27 of the bolts when the latter are drawn in place to prevent turning of the head 22. The fillets, cooperating with the niches 26, function as a locking device to guard against the accidental loosening of the clamp caused by vibration in service.

As shown in Figs. 13 and 17, the clamping member 19 may be pressed to form a recess 30 adapted to receive the bolt head 22. Recess 30 is disposed with its longitudinal axis at right angles to the slot 20 and the bolt head after being inserted through the slot is turned 90° to fit in the recess which keeps it from turning.

It is evident that by utilizing clamps of the shape of the inner dimensions of the medallions, they may be intimately joined with the side flanges of the latter and provide an inexpensive mechanically durable structure which is readily fabricated without the use of expensive and complicated forming dies. By shaping the clamping members to the form of the medallion or that portion of the latter with which they are intimately engaged they are assured of their proper positions and cannot be displaced either during their fabrication or when in use. The clamping means herein provided further eliminate the necessity for perforating the medallion to receive fastening elements, and produces a structure that is highly ornamental in appearance and mechanically simple in its application.

Although several embodiments of the invention have been herein illustrated and described, it will be obvious to those skilled in the art that various modifications may be made in the details of construction without departing from the principles herein set forth.

I claim:

1. A clamp for fastening bumpers for automobiles comprising a medallion having a peripheral flange, and a clamping bracket secured to said flange in spaced relation with said medallion, said bracket having a relatively narrow opening for a bolt the head of which is complementary to the shape of said opening whereby the bolt may be inserted with its head in the space between the bracket and medallion and turned with the longitudinal axis of the head at right angles to the longitudinal axis of said opening.

2. A clamp for fastening bumpers for automobiles comprising a medallion having a clamping bracket secured thereto, said bracket being of such shape and length as to extend over and engage the bumper bars and being further provided with means for inserting a bolt head for clamping to such bars.

3. A clamp as set forth in claim 2 having a recess offset out of alinement with the bolt receiving means and being adapted to seat the bolt head after it is inserted in the bracket.

4. A clamp for fastening bumpers for automobiles comprising a medallion having a hollow side for receiving a clamping bracket therein, and a clamping bracket secured to said medallion in spaced relation therewith, said bracket having its edges turned to form parallel flanges in opposite directions.

5. A clamp for fastening bumpers for automobiles, comprising a medallion of a hollow cross-section, the edges of which are shaped to engage one or more bumper bars and having a clamp bracket secured to the sides of said medallion in spaced relation with the closed end thereof for receiving a clamping bolt, said bracket being of a length to extend to and engage the bumper bar and having engaging faces complementary to the shape of the portion of the bar with which it comes in contact whereby the clamping strain of the bolt is exerted on the contacting edges of the bracket and the bar.

In testimony whereof I have hereunto set my hand this 14th day of March, 1930.

GALE H. HEDRICK.